United States Patent [19]
Terashima et al.

[11] Patent Number: 5,943,396
[45] Date of Patent: Aug. 24, 1999

[54] SYSTEM AND METHOD FOR PREVENTING UNAUTHORIZED USE OF A MICRO CELLULAR SYSTEM

[75] Inventors: Masaki Terashima; Jun Yamada, both of Yokohama; Jun Nagamatsu, Kawasaki, all of Japan

[73] Assignee: Matsushita Electric Industrial Co., Ltd.., Japan

[21] Appl. No.: 08/576,840

[22] Filed: Dec. 21, 1995

Related U.S. Application Data

[63] Continuation of application No. 08/216,045, Mar. 22, 1994, abandoned.

[30] Foreign Application Priority Data

Mar. 26, 1993 [JP] Japan ......................... 5-68661

[51] Int. Cl.$^6$ ..................................................... H04Q 7/22
[52] U.S. Cl. ......................... 379/59; 455/33.1; 455/56.1; 455/33.4
[58] Field of Search ................................. 379/58, 59, 60, 379/61, 62, 63; 455/33.1, 33.2, 54.1, 56.1, 33.4

[56] References Cited

U.S. PATENT DOCUMENTS

| | | | |
|---|---|---|---|
| 4,748,655 | 5/1988 | Thrower et al. | 379/60 |
| 5,142,691 | 8/1992 | Freeburg et al. | . |
| 5,159,625 | 10/1992 | Zicker | 379/59 |
| 5,239,680 | 8/1993 | Grube et al. | . |

*Primary Examiner*—Dwayne Bost
*Assistant Examiner*—G. J. Oehling
*Attorney, Agent, or Firm*—Amster, Rothstein&Ebenstein

[57] ABSTRACT

In a micro cellular system (MCS) which co-exists with a cellular system (CMTS) in a frequency band, fraudulent use of the MCS when it is moved from the CMTS to the location of another CMTS is prevented by providing a control unit 2 in the MCS which controls the overall operation of the MCS and a system ID receiving and judging unit which is capable of receiving all the downward control channels used in the CMTS. When the system ID receiving and judging unit receives a system ID transmitted from the CMTS which matches a system ID stored in the MTS, the control unit is allowed to start the operations of the MCS. Otherwise, the MCS is disabled. Therefore, if the MCS moves to another CMTS zone where the system ID is different, it is impossible to operate the MCS.

11 Claims, 4 Drawing Sheets

5,943,396

SYSTEM AND METHOD FOR PREVENTING UNAUTHORIZED USE OF A MICRO CELLULAR SYSTEM

This application is a continuation of application Ser. No. 08/216,045 filed on Mar. 22, 1994 now abandoned.

The present invention relates to a system and method for the operation of a micro cellular system (hereinafter referred to as MCS) which co-exists with a cellular mobile telephone system (hereinafter referred to as CMTS) on a frequency band, which prevents fraudulent use of the micro cellular system when it is separated from the control of a system controller.

BACKGROUND OF THE INVENTION

Formerly, micro cellular systems may be broadly divided into two types. In one type of system, the transmission output from a wireless machine in a base station is reduced, thereby reducing the cell radius in the CMTS. This system has been implemented with the main purpose of increasing the repetition utilization efficiency of a frequency and thus increasing the number of mobile terminals to be accommodated per unit area. This system is essentially not different from a CMTS at all excepting that the cell radius is smaller, and the frequency band used in the MCS is the same as in the CMTS. In addition, in general, an operator of the CMTS controls and operates this system. An example of the system configuration of this system is shown in FIG. 3.

In FIG. 3, the base station 101 for the CMTS and the base station 102 for the MCS 102 are directly connected to the cellular switching station (mobile telephone switching office) 103, and the control and operation of each of the base stations 101 and 102 are all carried out by the cellular switching station 103 in a centralized manner. Therefore, countermeasures against fraudulent use of the base stations 101 and 102 are carried out through the cellular switching station 103 and are the responsibility of the operator of the cellular switching station 103.

The second type of system is one which provides a special mobile communication service by using a frequency band which is different from that for the CMTS, with a system configuration of miniaturized CMTS, and with a certain limited area as a service zone. For example, a system called wireless PBX is a typical example, and FIG. 4 shows an example of the system configuration. This system generally uses legally defined extremely low transmission power, thereby making it unnecessary for a specific operator to control and operate it, and a user purchases a whole system and controls and operates it as its own private facilities.

In FIG. 4 an in-house switching unit 201 is connected to a public telephone communication network. A control unit 202 is connected to the in-house switching unit 201. A plurality of base stations 203 are connected to the control unit 202 by wires. A mobile station 204 is connected to a base station 203 by wireless means, and 205 is a wireless zone constituted with a plurality of the base stations 203. Each of the constituting equipment and devices shown in FIG. 4 are generally small in size and light in weight, and can be easily moved and installed. Countermeasures against fraudulent use of these equipment and devices are taken by each user by its own independent method.

In recent years, there has appeared a new MCS which does not belong to any of the above-mentioned systems. While this system utilizes the same frequency band as the CMTS, it is an independent MCS like a wireless PBX which works by avoiding mutual interference with the CMTS, and therefore its system configuration is similar to that shown in FIG. 4.

Since an MCS of this type is installed in each user site, and the ownership of the system resides in each user, the daily control and operation is carried out by each user, but a cellular operator must be responsible for the control and operation of the frequencies.

However, since such a new MCS is small in size and light in weight, it can be relatively easily moved and installed. Therefore, a user can move and install an MCS from an initial location of installation to another location, depending on its own needs and convenience. Unless necessary procedures for the co-existence of an MCS and a CMTS are carried out properly at the location to which it has been moved, there is a possibility that an MCS may interfere and hinder a CMTS. Especially, in a case in which the location of the move is a territory of another cellular operator, it means that a wireless facility which the cellular operator at the location of move does not recognize is operated and it might develop into a serious problem of responsibility.

SUMMARY OF THE INVENTION

The present invention is to solve these conventional problems, and the purpose of the present invention is to provide an operational method of an MCS by which to prevent an MCS using commonly the same frequency band as a CMTS from being moved from its installation location without permission and being used fraudulently.

In order to achieve the above-mentioned purpose, the present invention relates to a system and method for the operation of a micro cellular system which operates in a frequency band in common with a cellular system, characterized in that the microcellular system consists of a control unit which performs operations, connection and disconnection in the micro cellular system; and a receiving means which is connected to the above-mentioned control unit and is capable of receiving downward control channels used in the cellular system; and that only in the case in which, prior to the start of the operation of a micro cellular system, the above-mentioned receiving means receives a predetermined system identification code of a cellular system, is the above-mentioned control unit allowed to start the operation of the micro cellular system.

In addition, the present invention relates to a micro cellular system which operates on a frequency band in common with a cellular system, characterized in that it consists of a control unit which performs operations, connection and disconnection in a micro cellular system, a base station or stations connected to the above-mentioned control unit by wires, mobile stations wirelessly connected to the above-mentioned base station/stations, and a system identification code receiving and judging means which receives a system identification code established in advance for the cellular system from downward control channels used in the cellular system, and only when the received system identification code coincides with a system identification code registered in the micro cellular system is the operation of the micro cellular system allowed.

Therefore, with the present invention, since an MCS can be operated only in a wireless zone where a system identification code of a CMTS to which the MCS belongs can be detected, if a user, etc. of an MCS moves the MCS from its original installation location without permission and tries to use it without permission of a system controller, it becomes possible to prohibit its operation because a system identification code received at the location of the move is different from its own system identification code.

BRIEF DESCRIPTION OF THE DRAWINGS

For a full understanding of the nature, features and advantages of the present invention, reference should be made to the following description of a preferred but merely illustrative embodiment of the invention, in conjunction with the accompanying drawings wherein.

PREFERRED EMBODIMENT OF THE INVENTION

Figure 1:
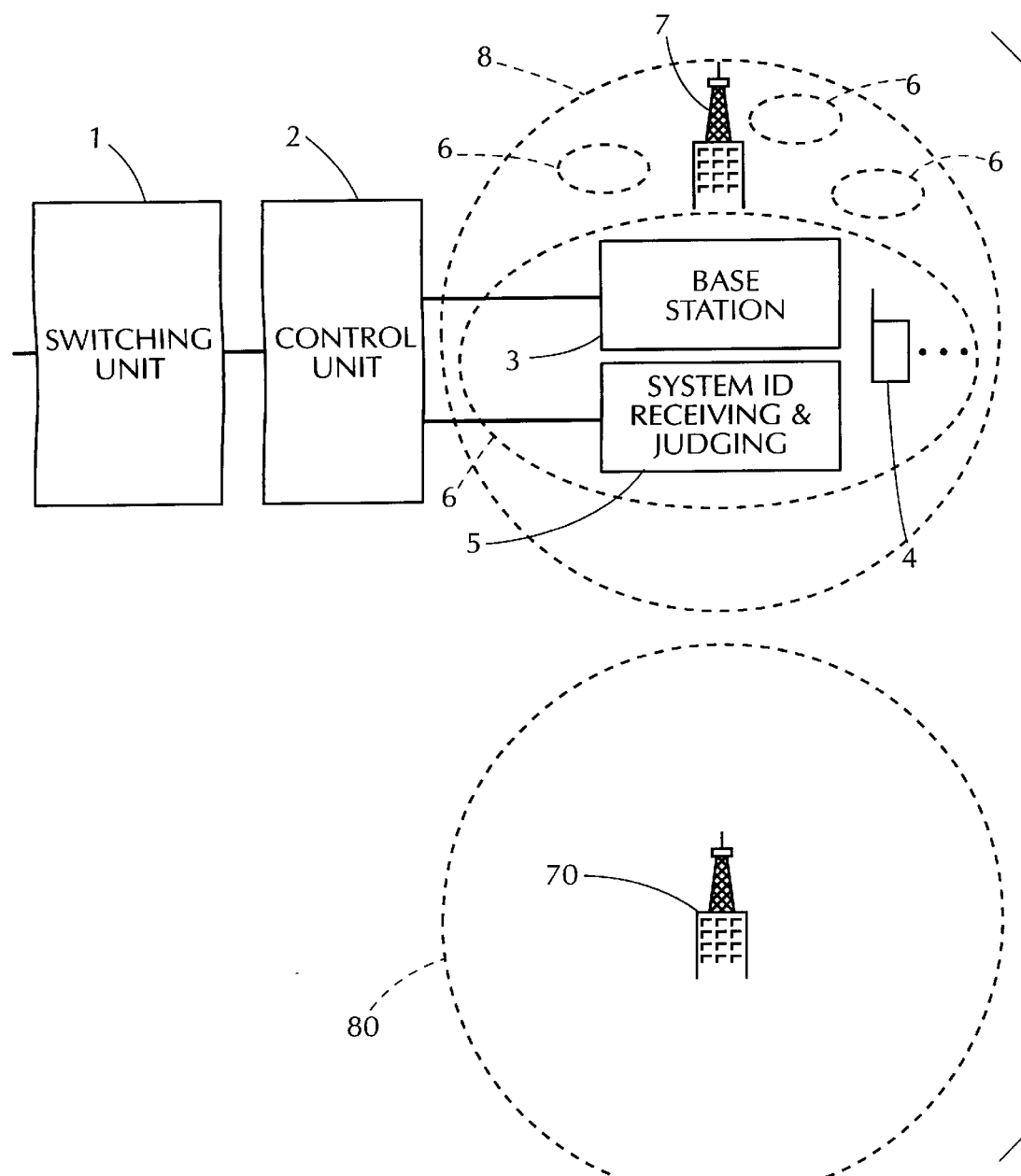
FIG. 1 shows a system configuration of a micro cellular system in one example embodying the present invention.

FIG. 1 illustrates a constitution of a micro cellular system (MCS) in one example embodying the present invention. In FIG. 1, the MCS is equipped with an in-house switching unit 1 which is connected to a public telephone communication network; a control unit 2 which is connected to the in-house switching unit 1, and which performs the continuation of an operation of the system or the disconnection thereof; a plurality of base stations 3 which are connected to the control unit 2 with wires; one or more mobile stations 4 which are wirelessly connected to the base stations 3, and a system identification ("ID") receiving and judging unit 5 which is connected to the control unit 2 by a data line and receives a system ID which is a system identification code, and judges it. One MCS zone 6 is constituted with a plurality of base stations 3, and a plurality of the MCS zones 6 are located in a CMTS zone 8 which is a control zone of a CMTS base station 7.

Figure 2:
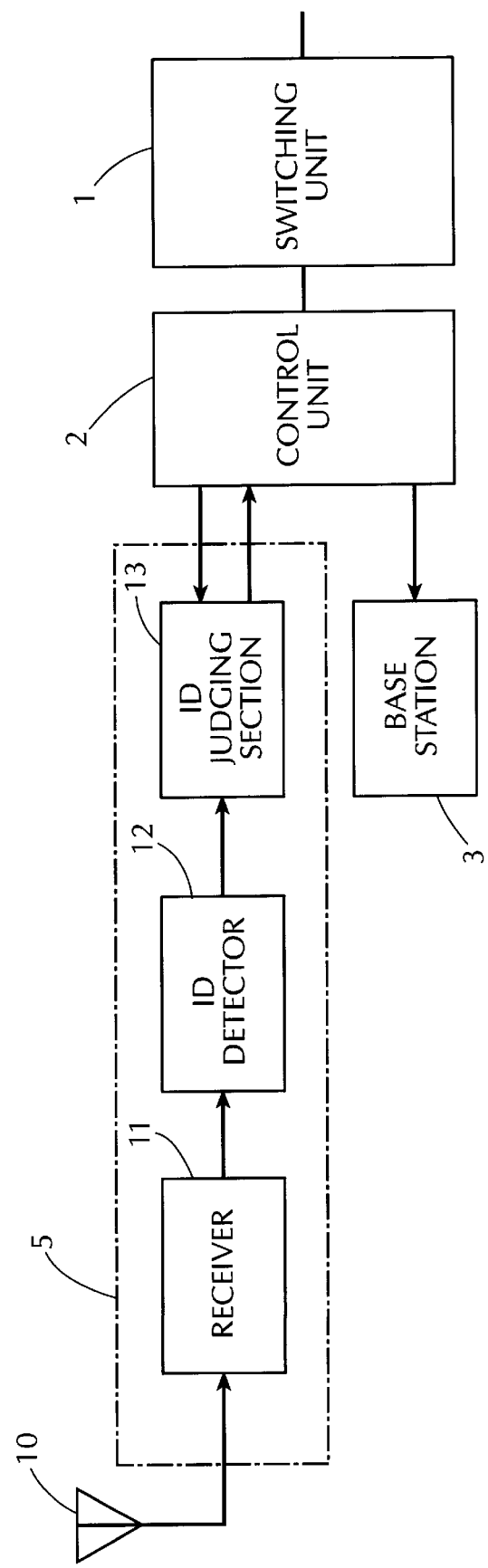
FIG. 2 is a block diagram showing the internal circuit elements of the system ID receiving and judging unit of the present invention.
Figure 3:
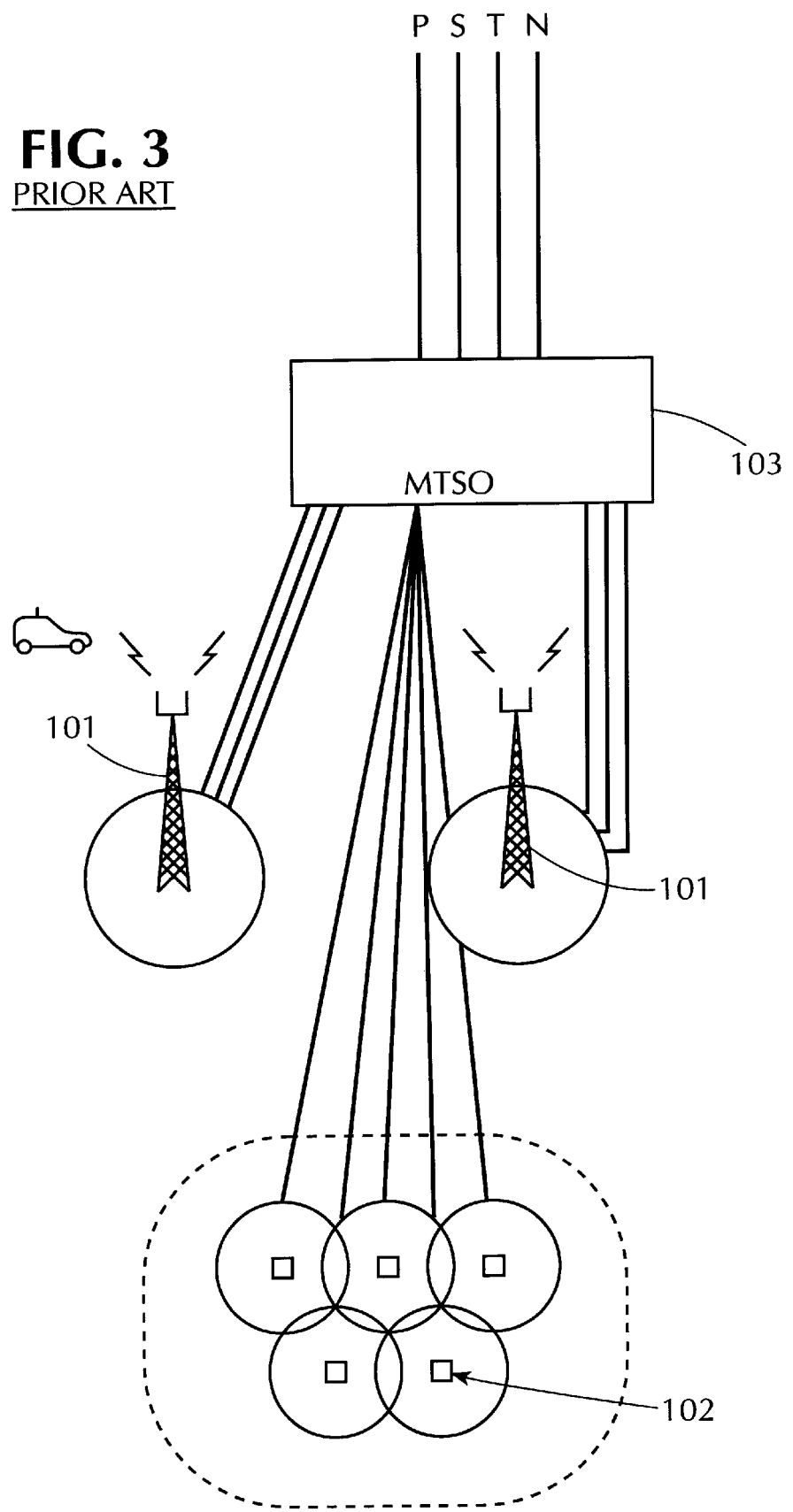
FIG. 3 is a system configuration which illustrates an example of a prior art micro cellular system.
Figure 4:
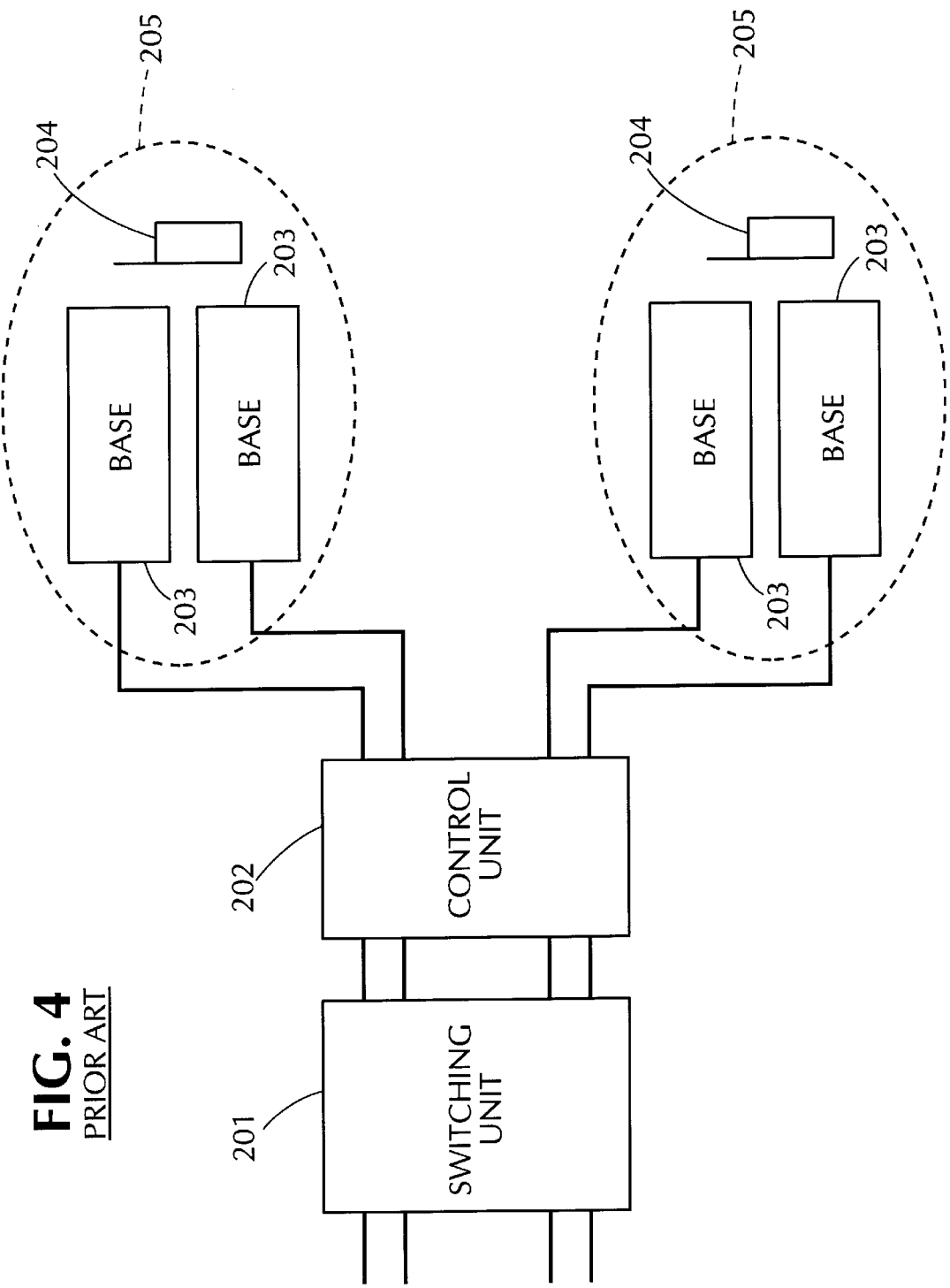
FIG. 4 is a system configuration which illustrates another example of a prior art micro cellular system.

FIG. 2 shows the constitution of the system ID receiving and judging unit 5 in the above-mentioned example embodying the present invention which includes an antenna 10, and a CMTS downward control channel receiving section 11 which is capable of receiving data of all the downward control channels transmitted from the CMTS base station 7. A system ID detection section 12 detects a system ID from the data received, and 13 is a system ID judging section 13 which compares the system ID detected with the system ID registered in the MCS zone 6. The system ID judging section 13 is connected to the control unit 2.

Next, let us explain the actions of the above-mentioned example embodying the present invention. In the explanation below, suppose the system ID of the CMTS base station 7 is "X", and the system ID of a CMTS base station 70 operated by another operator is "Y". In the MCS zone 6 which uses the same frequency band as the CMTS zone 8, the system ID of the CMTS base station 7 has been registered in the control unit 2 at the time of the installation of the MCS. In the system ID receiving and judging section 5, the CMTS downward control channel receiving section 11 is searching a control channel allotted to its own MCS zone 6 through the antenna 10, and when the data from the control channel is received, it is demodulated and the system ID detection section 12 detects a system ID from the data. The system ID detected is compared with the system ID registered in the control unit 2 at the system ID judging section 13, and only if there is correspondence, a system operation permission indication signal is transmitted to the control unit 2. The control unit 2 which has received this signal transmits a system operation instruction signal to the base station 3, thereby allowing the MCS to begin operating. By this, the mobile station 5 can communicate with the public telephone communication network through the base station 3 and the in-house switching unit 1 by an ordinary method.

On the other hand, in a case in which an MCS including this mobile station 4 moves to a CMTS zone 80 of another operator with a different ID, and it tries to operate without obtaining permission, since the system ID transmitted from the CMTS base station 70 of this CMTS zone 80 is different from the system ID of the CMS, the system ID receiving and judging unit 5 of the moved MCS can not transmit a system operation permit instruction signal to the control unit 2, and it becomes impossible to use the MCS at the moved location.

In this manner, in the above-mentioned example embodying the present invention, only in a case in which the system ID receiving and judging unit 5 receives a system ID of a CMTS zone 8 to which it belongs, can the control unit 2 transmit a system operation permit instruction signal, and thus since it is impossible to use it in another CMTS zone 80 where the operator is different, it is possible to prevent fraudulent use of an MCS.

In the above-mentioned example embodying the present invention, the system ID receiving and judging unit 5 is provided independently of the control unit 2 and the base station 3, but it is permissible to equip a mobile station 4 or a base station 3 with a function similar to the system ID receiving and judging unit 5. It is also permissible to separate the system ID receiving section and the system ID judging section, to install the receiving section in a mobile station 4 or a base station 3, and the judging section in a base station 3 or in a control unit 2.

Furthermore, in a case in which a plurality of system ID receiving and judging units 5 or similar functions are installed in different locations in the same MCS zone, it is also permissible to arrange it in such a manner that only when at least one of them receives the system ID to which it belongs, can the control unit 2 start operations of the system.

In addition, in a case in which a system ID judging section is installed in a base station 3 or in the control unit 2, it is also permissible to arrange it in such a manner that it judges whether or not the system ID receiving section is connected to the control unit 2, and only if it is connected, the system ID judgment may be carried out or the operations of the system may be started, thereby increasing the safety of the system.

As can be clearly seen from the above-mentioned example embodying the present invention, since the operation of an MCS can be started only when a system identification code of a CMTS designated by an MCS operator which is generally a CMTS operator is received, it is possible to prohibit its use in an area of another CMTS operator with a different system identification code, and thus it becomes possible to prevent fraudulent use of an MCS at a location other than a location designated by an MCS operator.

What we claim is:

1. A microcellular system (MCS) operating in an area independently of a cellular mobile telephone system (CMTS) also operating in said area to provide wireless communications with mobile stations operating in said MCS, said MCS being enabled to provide said wireless communications only when located within an area serviced by an authorizing CMTS, said MCS comprising:

one or more base stations;

a control unit coupled to one or more of said base stations for controlling the operation of said MCS; and at least one receiving and judging unit coupled to said control unit for receiving a system identification transmitted by said CMTS and for generating an enabling signal to said control unit for permitting said MCS to provide wireless communications between one or more mobile stations and one or more of said MCS base stations only if said system identification indicates that said CMTS is said authorizing CMTS.

2. The micro cellular system in accordance with claim 1 wherein said receiving and judging unit comprises:

means for storing a system identification corresponding to said authorizing CMTS; and means for judging whether said received system identification matches said stored system identification.

3. The micro cellular system in accordance with claim 1 wherein said receiving and judging unit receives said system identification on a control channel of said CMTS.

4. The micro cellular system in accordance with claim 1 wherein said receiving and judging unit is provided at one or more of said base stations.

5. The micro cellular system in accordance with claim 1 wherein said receiving and judging unit is provided at said control unit.

6. The microcellular system in accordance with claim 1 wherein said receiving and judging unit further determines if there is an operable connection between said receiving and judging unit and the control unit and permits said MCS to operate only if said operable connection exists.

7. In a microcellular system (MCS) having a control unit for controlling the operation of said MCS, and one or more MCS base stations coupled to said control unit, said MCS operating in an area independently of a cellular mobile telephone system (CMTS) also operating in said area to provide wireless communications between one or more mobile stations and one or more of said MCS base stations, a method for enabling said MCS to provide said wireless communications only when located in the area of an authorizing CMTS, comprising the steps of:

receiving at said MCS a system identification transmitted by said CMTS;

comparing at said MCS said received system identification to a system identification of said authorizing CMTS stored in said MCS; and enabling said MCS to provide wireless communications between said one or more of said mobile stations and one or more of said MCS base stations only if said received system identification matches said stored system identification.

8. The method in accordance with claim 7 wherein said received system identification is obtained by monitoring the control channels of said CMTS.

9. In a microcellular system (MCS) having a control unit for controlling the operation of said MCS, one or more MCS base stations coupled to said control unit, and a receiving and judging unit coupled to said control unit, said MCS operating in an area independently of a cellular mobile telephone system (CMTS) also operating in said area to provide wireless communications between one or more mobile stations and one or more of said MCS base stations, a method for enabling said MCS to provide said wireless communications only when located in the area of an authorizing CMTS, comprising the steps of:

receiving, at said receiving and judging unit, a system identification transmitted by said CMTS;

determining if there is a match between said received system identification and a system identification corresponding to said authorizing CMTS stored in said MCS; and providing an enabling signal from said receiving and judging unit to said control unit to enable said MCS to provide wireless communications between one or more of said mobile stations and one or more of said MCS base stations only in the event of said match.

10. The method of claim 9 wherein the step of receiving includes monitoring the control channels of said CMTS and detecting a system identification transmitted thereon.

11. The method of claim 9 further comprising the step of determining if there is an operable connection between said receiving and judging unit and said control unit and enabling operation of said MCS only if said operable connection exists.

* * * * *